Dec. 30, 1969  R. W. STOFFEL ET AL  3,486,791
ENERGY ABSORBING MEANS

Filed July 21, 1967  2 Sheets-Sheet 1

INVENTOR
ROBERT W. STOFFEL
WENDELL STEVENSON
BY
Hauke, Krass & Gifford
ATTORNEYS Dec. 30, 1969    R. W. STOFFEL ET AL    3,486,791
ENERGY ABSORBING MEANS Filed July 21, 1967    2 Sheets-Sheet 2

INVENTOR.
ROBERT W. STOFFEL
WENDELL STEVENSON
BY
ATTORNEYS.

United States Patent Office 3,486,791
Patented Dec. 30, 1969

3,486,791
ENERGY ABSORBING MEANS
Robert W. Stoffel, Ferndale, and Wendell Stevenson, New Baltimore, Mich., assignors to Jim Robbins Seat Belt Co., Royal Oak, Mich.
Filed July 21, 1967, Ser. No. 655,233
Int. Cl. B60r 21/10; F16d 63/00
U.S. Cl. 297—386          7 Claims

ABSTRACT OF THE DISCLOSURE

Various devices are disclosed which act on a vehicle seat belt to absorb the kinetic energy of a moving body restrained by the belt. Four embodiments separate a slack section of the belt from the taut body restraining section by clamping means which yield under a predetermined restraining force to gradually feed out the slack section so that the taut section elongates permitting the restrained body to move at a controlled velocity. Another embodiment anchors the belt to the vehicle by an anchor member attached to the belt and embedded in a solid plastic energy absorber mounted to the vehicle which has a shear strength permitting the anchor member to be withdrawn at a controlled rate when a predetermined restraining force is applied by the seat belt on the body.

BACKGROUND OF THE INVENTION

Field of the invention

This invention relates to systems for restraining the movement of a body relative to a moving vehicle and more specifically to means for absorbing the kinetic energy of a body restrained by a vehicle safety seat belt system and suddenly displaced from an initial position relative to the vehicle when the vehicle experiences an abrupt change in momentum.

Description of the prior art

A typical vehicle safety seat belt system is designed to restrict the displacement of an occupant with respect to his seated position within the vehicle when the vehicle experiences a sudden, sharp deceleration. The object of such seat belt systems is to prevent the occupant from continuing in the direction of the former travel of the vehicle until he is stopped by relatively unyielding injury-producing surfaces of the passenger compartment.

Crash studies have indicated that a secondary problem results when the occupant has both lap and shoulder belt restraints. After the initial vehicle impact, the occupant tends to move forwardly from his seated position until the slack in the belts has been taken up sufficiently to build restraining forces. The relatively unyielding belts then cause the occupant to rebound toward his original position where he often experiences neck and back injuries when he impacts the back structure of the seat assembly. In addition this rebound effect often snaps the occupant of a forward seat back along a common path with the forward movement of an unrestrained occupant of a rear seat until the two bodies come into a mutual injury-producing contact.

The broad purpose of the present invention is to provide a device which can be attached to a vehicle seat belt and acts on the belt so that the kinetic energy of an occupant suddenly and violently displaced from an initial position within the vehicle is absorbed by the device to eliminate the rebound effect of conventional seat belt systems.

SUMMARY

The preferred embodiment of the present invention, which will be subsequently described in greater detail, is described as an attachment for a shoulder harness section of a vehicle safety seat belt system. However, it is to be understood that the device could as well be attached to a lap section of the seat belt system. The preferred energy absorbing device is preferably mounted near a coupling section carried by the belt adapted to couple the belt to the lap portion of the seat belt system. Thus, the shoulder harness belt can be withdrawn into a suitable housing by a retractor when the belt is not being employed as a restraining means.

The preferred energy absorbing device comprises an open ended tubular housing mounted on the belt. The belt is inserted through the housing and has a series of folds forming a slack section intermediate the open ends of the housing. A pair of clamping members mounted adjacent each of the open ends of the housing engage the belt on opposite sides of the slack section.

When a normal restraining force is applied by the belt on the occupant, the belt becomes taut between the occupant and the vehicle with the exception of the slack section within the housing so that the restraining forces are transmitted through the taut section of the belt, the clamping members, and the housing. When the restraining forces applied by the belt on the occupant build up to a predetermined magnitude of 700 pounds which is associated with the occupant being suddenly displaced forwardly from a seated position when the vehicle has experienced an abrupt deceleration, the clamping members permit the slack section to slowly feed out from within the housing with the taut section of the belt gradually elongating so that the occupant moves from his initial position at a velocity controlled by the rate determined by the engagement between the clamping members and the belt. Thus, the occupant experiences a controlled cushioned deceleration with the kinetic energy of his forward movement being absorbed by the clamping members. At the end of his deceleration, there is no rebound effect.

Preferably, the belt has a maximum of 6 inches of slack so that the occupant's maximum forward displacement is limited.

Another embodiment of the present invention employs a pair of clamping units adjacent to each end of the housing, each clamping unit including an internal surface of the housing which is parallel to the movement of the belt, a wedge-like member having an inclined surface which converges toward the surface of the housing in the direction of belt movement and a roller member mounted on the inclined surface which normally wedges the belt against the housing surface for normal restraining forces but which commences to rotate when the restraining forces increase to the predetermined magnitude so that the belt gradually feeds out from the housing. Preferably the two clamping units permit the belt to feed out from the housing in opposite directions to increase the length of the taut restraining section of the belt.

Still another embodiment of the present invention is associated with the anchored end of the belt and illustrates how the invention can be employed with a slack section of the belt which is either intermediate the anchored end of the belt and the occupant restraining end of the belt or adjacent the anchored end of the belt. In this form of the invention, a housing attached to the vehicle has a pin engaging the terminal looped end of the belt so that when the belt is in a fully extended condition, it is fixedly connected to the vehicle. A pair of closely spaced pins are fixedly mounted to the housing. A third pin having a diameter greater than the distance between the fixed pins is rotatable about an axis transverse to the movement of the belt and displaceable toward and away from the opening defined between the fixed pins. The belt is looped between the two fixed pins and around the displaceable pin and is normally wedged between the fixed pins which provide a temporary anchoring point between the belt and the housing. The slack section of the belt is formed intermediate the permanent anchor pin and the two fixed pins. When the restraining forces applied by the belt and acting on the occupant increase to the predetermined magnitude, the belt slowly feeds out from the slack section as the movable pin rotates about its axis at a controlled rate. As the belt plays out under the influence of the forward movement of the occupant, the kinetic energy of the occupant is absorbed in the clamping action between the fixed and movable pins.

Another embodiment of the present invention also is associated with the means for anchoring the belt to the vehicle comprises an elongated anchor plate member which is attached to the end of the belt and embedded in a substantially rigid, deformable plastic material contained within a container which is fixedly mounted to the vehicle. The plastic material has a shear strength sufficient that normally the anchor member cannot move relative to the container under the influence of normal restraining forces, however when the restraining forces build up to the predetermined level associated with a violent deceleration of a vehicle, the anchor member commences to move lengthwise relative to the container with the plastic material retarding this movement and absorbing the kinetic energy of the occupant.

It is therefore an object of the present invention to provide an energy absorbing device attached to an intermediate portion of a vehicle safety belt which maintains a section of the seat belt in a slackened condition and other sections in a taut force-transmitting condition when normal restraining forces are acting on the belt and which gradually feeds out the slackened section of the belt so that the taut force-transmitting section of the belt gradually elongates when the belt applies a predetermined restraining force on an occupant so that the restrained occupant moves at a controlled velocity from an initial position relative to the vehicle.

Another object of the present invention is to provide means acting on a vehicle safety seat belt which absorbs the kinetic energy of an occupant of the belt as he is suddenly displaced from an initial seated position, the device being attached to the belt independently of the belt anchor means.

Still another object of the present invention is to provide a shock absorbing device which acts on a vehicle safety seat belt to absorb the kinetic energy of a body restrained by the seat belt which is suddenly displaced from an initial position within the vehicle, the device forming a part of the belt anchoring means.

A still further object of the present invention is to provide an energy absorbing device for a vehicle safety seat belt which has a non-energy absorbing condition when normal restraining forces are acting on the belt and an energy-absorbing condition when the restraining forces arting on the belt increase to a predetermined magnitude.

Another object of the present invention is to provide means for absorbing the kinetic energy of a body restrained by a continuous vehicle seat belt which employs a pair of clamping members for separating a slack section of the belt from the taut restraining section of the belt when normal restraining forces are applied by the belt to a restrained body, the clamping members permitting a controlled feed-out of the slack section of the belt so that the taut section gradually elongates to permit he restrained body to move from an initial position at a controlled velocity.

Still another object of the present invention is to provide means for controlling the velocity of a restrained body relative to a vehicle when the vehicle suddenly experiences an abrupt change in momentum which employs a restraining belt having one end partially embracing the occupant and adapted to apply restraining forces on the occupant and the other end attached to an anchor member embedded in a plastic material disposed within a container fixedly mounted to the vehicle, the plastic material resisting movement of the anchor member relative to the container under normal restraining forces but permitting the anchor member to move at a retarded energy absorbing rate when a predetermined restraining force is applied by the belt on the body.

Still further objects and advantages of the present invention will readily occur to one skilled in the art to which the invention pertains upon reference to the following detailed description.

DESCRIPTION OF THE DRAWINGS

The description refers to the accompanying drawings in which like reference characters refer to like parts throughout several views and in which.

DESCRIPTION OF THE PREFERRED EMBODIMENTS

Figures 1, 2, 3, 4:
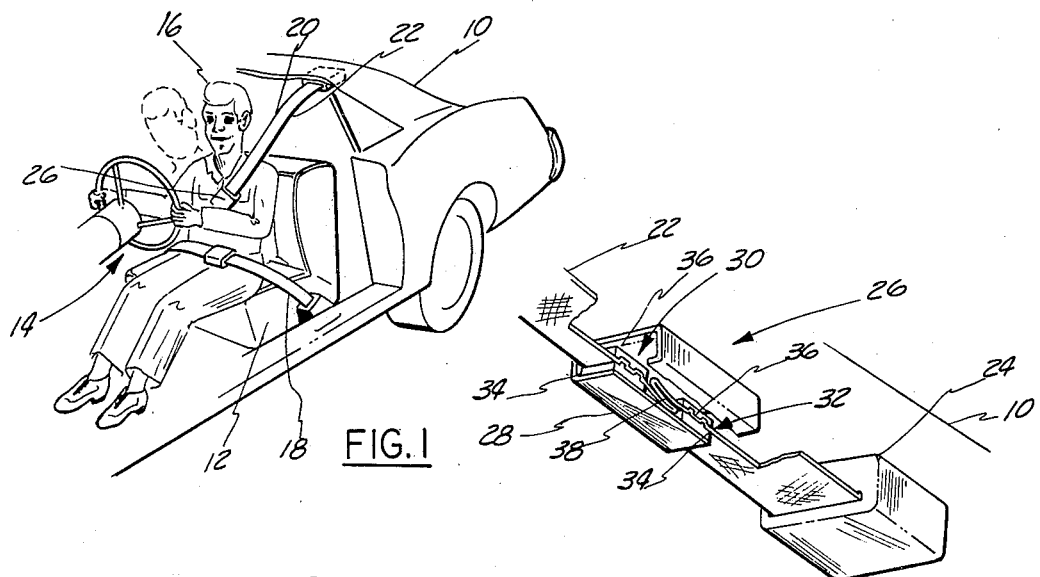
FIG. 1 is a fragmentary perspective view of a vehicle, with a seat belt system having lap and shoulder portions for restraining an occupant of the vehicle and with an energy absorbing device illustrating the preferred embodiment of the invention mounted on the shoulder portion of the system.
FIG. 2 is an enlarged perspective view of the preferred energy absorbing device of FIG. 1 with parts broken away for purposes of description.
FIG. 3 is a fragmentary perspective view of another embodiment of the invention.
FIG. 4 is a fragmentary perspective view of still another embodiment of the invention employing clamping means with a roller clamping member mounted between converging surfaces.

Now referring to the drawings, FIG. 1 illustrates a vehicle 10 having a seat assembly 12 and a seat belt system 14 mounted to the vehicle for controlling the movements of an occupant 16 which is considered as a restrained body seated on the seat assembly 12. The seat belt system 14, for purposes of description, has a lap belt portion 18 with lower ends anchored to the vehicle 10 and a shoulder harness portion 20 which forms a connection between the lap belt portion 18 and the vehicle 10 and provides an upper torso restraining force on the occupant 16.

The preferred energy absorbing device is described as an attachment for the shoulder harness portion 20, however, it is to be understood that the energy absorbing device could as well be mounted on the lap belt section 18 to control the movement of the occupant 16 as he is suddenly shifted from an initial seated position illustrated in solid lines in FIG. 1 forwardly to a position illustrated in phantom upon an occurrence producing an abrupt, sudden deceleration of the vehicle 10.

The shoulder harness 20 of the seat belt system comprises an elongated section of webbing 22 having its lower end partially embracing the occupant 16 for the application of restraining forces and an upper end attached by a suitable retractor 24 adapted to withdraw the webbing 22 to a stored position when the webbing is not employed as a restraining element. The retractor 24 may be of the inertial locking type operative upon the application of forces acting on the occupant 16 tending to displace the occupant from his initial seated position to provide a non-yielding connection between the webbing 20 and the vehicle 10.

The retractor 24 could as well be replaced by non-retracting fixed connection to the vehicle 10. FIG. 2 illustrates the webbing 20 as being substantially, fully retracted within the retractor 24.

A preferred energy absorbing device 26 is mounted on the webbing 20 and preferably comprises an elongated tubular section 28 having a generally rectangular cross section and opposite open ends. The section 28 is preferably formed of sheet metal into a closed configuration.

A pair of clamping means 30 and 32 are mounted adjacent the opposite open ends of the tubular section 28 and are similar to one another. Each of the clamping means 30 and 32 comprises a pair of clamping elements 34 and 36 formed of a nylon, or other lightweight plastic material. The clamping elements 34 and 36 are closely spaced from one another and have clamping surfaces engaged with the webbing 22. The clamping surfaces preferably comprise a series of transverse grooves having a rectangular cross section and opposedly mounted with respect to a transverse rectangular ridge in the companion clamping member. The webbing 22 is threaded between the clamping surfaces of the clamping means 30, and folded into a slack section 38 between the clamping means 30 and 32 and then threaded between the clamping elements of the clamping means 32.

In operation, the application of a restraining force on the occupant 16 by the webbing 22 initially absorbs the slack in the webbing 22 exteriorly of the energy absorbing device 26 so that the entire webbing between the retractor 24 and the occupant 16 becomes taut with the exception of the slack section 38. The restraining forces are transmitted through the taut section of the webbing to the clamping means 30, the housing 28 and then to the clamping means 32 with the slack section in a relaxed condition. When the restraining forces applied by the webbing 22 increase to a predetermined magnitude of about 700 pounds, the slack section 38 of the webbing commences to feed out between the clamping members of the clamping means 30 and 32 so that the taut force transmitting section of the webbing between the retractor 24 and the occupant 16 gradually elongates. The occupant commences to move forwardly at a controlled velocity dependent on the feed out of the slack section 38.

If the vehicle 10 has been violently decelerated, the occupant 16 moves forwardly in a gradual deceleration as the slack section 38 issues from between the clamping means 30 and 32. The slack section 38 preferably has about 6 inches of webbing so that the occupant 16 can move forward under the predetermined restraining force a total distance of about 6 inches before his forward travel is terminated. As the webbing feeds out between the clamping elements 34 and 36 of each of the clamping means in a nonlinear path, the friction generated between the webbing 22 and the clamping elements absorbs the kinetic energy of the occupant 16 so that at the end of his forward travel, he does not experience a rebound toward his initial seated position.

Another embodiment of the invention is illustrated in FIG. 3 and is similar to the preferred embodiment of FIG. 2 including the elongated tubular section 28. However, the clamping means 40 and 42 fixed to the tubular section 28 on opposite sides of the slack section 38 comprise a pair of clamping elements 44 and 46 having clamping surfaces formed by a series of complementary ridges 48 and grooves 50 opposing one another and formed transversely to the longitudinal movement of the webbing 22. The ridges and grooves each have a V-shaped cross section as opposed to the rectangular cross section of the grooves of the clamping elements 34 and 36 of FIG. 2. In other respects, the operation of the embodiment of FIG. 3 is similar to that of the device of FIG. 2.

FIG. 4 illustrates still another variation of the preferred energy absorbing device which is similar to the device of FIG. 2 and includes a tubular section 52 having a rectangular cross section and open at its opposite ends. Clamping means 54 and 56 are mounted adjacent the open ends of the tubular section 52 and on opposite sides of the slack section 38 of the webbing. In this form of the invention, the clamping means 54 and 56 are similar to one another but reversed as illustrated in FIG. 4 and each includes a member 58 having an inclined surface 60 converging toward the inner surface 62 of the tubular section 62. A roller member 64 is mounted movably on each of the inclined surfaces 60. The webbing extends from the slack section 38 between the roller member 64 and the surface 62 of the tubular section and is clamped therebetween. When the restraining force applied by the webbing 22 increases to the predetermined magnitude of 700 pounds, the roller member 64 commences to rotate so that the webbing 22 feed out from the slack section 38 thereby elongating the taut restraining portion of the webbing 22 in the matter described with reference to the embodiment of FIG. 2.

The embodiments of FIGS. 2, 3, and 4 are each characterized in that they provide energy absorbing means for absorbing the kinetic energy of the occupant 16 when the restraining forces on the belt 22 have increased to a predetermined magnitude and are mounted on the belt 22 independently of the means employed for anchoring the webbing 22 to the vehicle 10.

Figure 5:
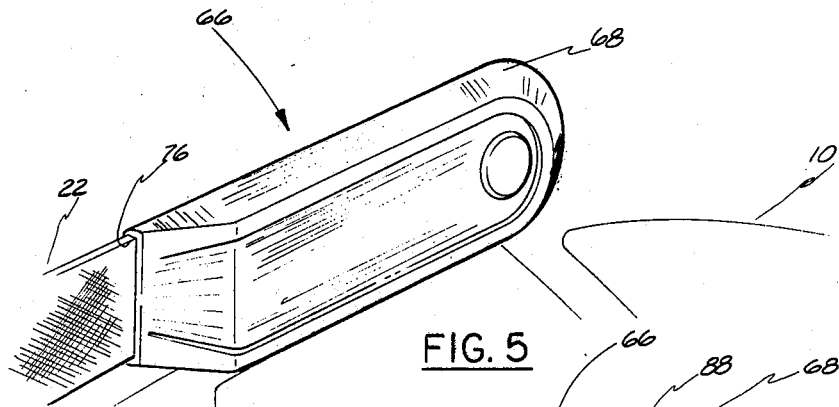
FIG. 5 is a perspective view of another embodiment of the invention illustrating means for forming the slack section of the belt adjacent the anchored end of the shoulder harness webbing.
Figure 6:
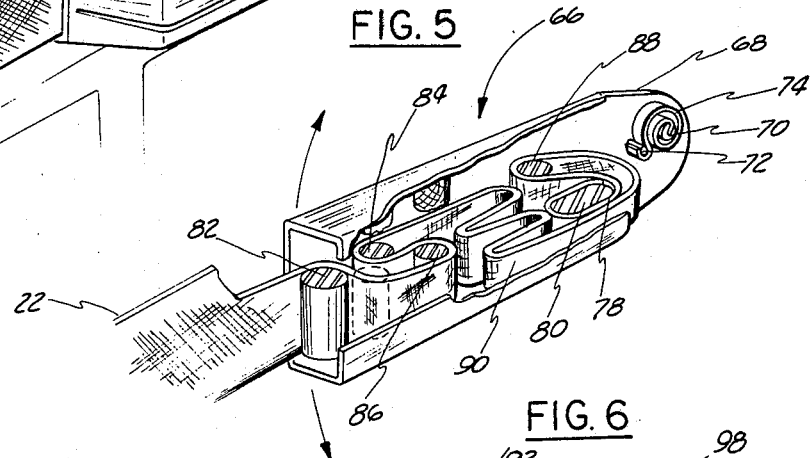
FIG. 6 is a view similar to FIG. 5 but with parts broken away for purposes of description.

FIGS. 5-6 illustrate an energy absorbing device 66 for controlling the movement of the webbing 22 when the webbing is applying restraining forces on the occupant 16 and is associated with the means for anchoring the webbing 22 to the vehicle 10. The device 66 comprises an elongated, generally closed housing 68 having one end mounted to a pin 70 which is fixedly attached to the vehicle 10. The housing 68 is pivotally mounted on the pin 70 and carries a fixed pin 72. A coil spring 74 wrapped around the pin 70 and having one end fixed thereto has its opposite end reacting against the pin 72 to normally maintain the housing 68 in a generally horizontal position. When a restraining force is applied to the webbing 22, the housing 68 is inclined downwardly toward the occupant 16 so that the webbing 22 can be fed out through an opening 76 at the forward end of the housing 68.

The terminal end of the webbing 22 is formed with a loop 78 which engages a fixed anchor member 80 carried within the housing 68 so that when the webbing 22 is fully extended, the member 80 provides a fixed attachment between the webbing 22 and the housing 68. A pair of pins 82 and 84 are fixedly mounted within the housing 68 adjacent the opening 76. The pins 82 and 84 are mounted in close proximity to one another.

A displaceable clamping pin 86 having a diameter greater than the distance between the pins 82 and 84 and preferably having a knurled surface is free rolling about an axis transverse to the longitudinal movement of the webbing 22 and is disposed within the housing 68.

The webbing extends from the anchor member 80 around a fixed anchor pin 88, and then is formed into a series of folds to form a slack section 90. The webbing extends from the slack section 90 and is threaded between the pins 82 and 84 and around the free clamping pin 86 and then returned out between the pins 82 and 84 and issues through the opening 76.

When the webbing 22 applies a restraining force to the occupant 16, the webbing commences to become taut as the slack is absorbed by the occupant shifting forwardly. The restraining force moves the pin 86 toward the fixed pins 82 and 84 until the webbing is clamped between the three pins. The pins 82, 84 and 86 provide a temporary anchoring means between the taut portion of the webbing 22 and the housing 68 until the restraining force increases to the predetermined magnitude of 700 pounds at which time the pin 86 commences to rotate and slowly feeds the webbing from the slack section 90 outwardly through the opening 76 so that the length of the taut portion of the webbing 22 elongates thereby permitting the occupant to move at a controlled velocity as he decelerates. The kinetic energy of the moving occupant is absorbed in the work of rotating the pin 86 about its axis. The slack section 90 preferably allows a maximum elongation of the taut section of 6 inches at which time the forward travel of the occupant is terminated. This embodiment also provides the occupant with an energy absorbing deceleration when the vehicle is characteristic of conventional seat belt system.

Figure 7:
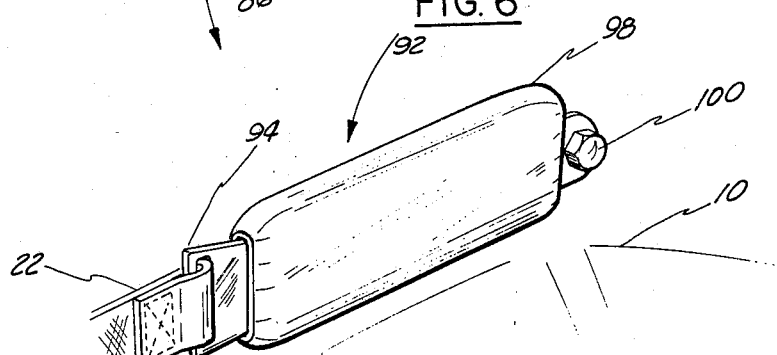
FIG. 7 is a view of another preferred energy absorbing device associated with the anchored end of the belt.
Figure 8:
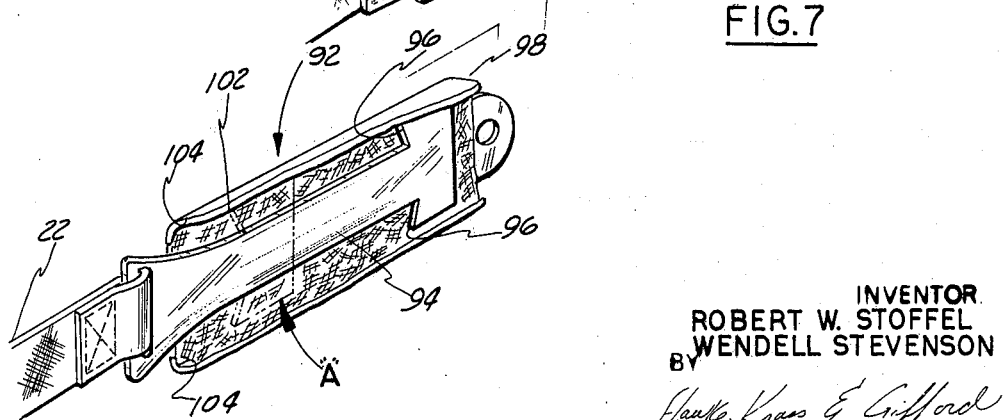
FIG. 8 is a view similar to FIG. 7 but with parts broken away for purposes of description.

FIGS. 7 and 8 illustrate an energy absorbing device 92 which directly connects the webbing 22 to the vehicle 10 without any slack section. In this form of the invention, the webbing 22 is attached to an elongated flat anchor member 94 having a pair of lateral shoulders 96 extending in a direction lateral to the movement of the anchor member 94.

An elongated container 98 is fixedly attached to the vehicle 10 by a threaded fastener 100 and is substantially filled with a substantially rigid, deformable plastic material 102. The anchor member 94 is embedded in the plastic material 102 and normally fixedly held in place when the webbing 22 applies a normal restraining force to the occupant 16.

When the restraining force applied by the webbing 22 increases to the predetermined magnitude of 700 pounds, the anchor member 94 commences to move longitudinally within the container 98 with the plastic material 102 providing a retarding energy absorbing resistance acting on the shoulders 96 so that the accupant 16 moves forwardly at a controlled velocity. As the occupant 16 shifts forwardly, his kinetic energy is absorbed by the anchor member 94 moving in the plastic material 102. The member 94 moves longitudinally within the container 98 until the restraining force is reduced below the predetermined magnitude with the anchor member coming to rest at an intermediate position such as is illustrated at A in FIG. 8. If the restraining force is maintained above the predetermined magnitude, the anchor member 94 travels a total distance of 6 inches until the shoulders 96 come into engagement with abutments 104 at the end of the container 98 thereby terminating the travel of the anchor member 94 and also the forward movement of the occupant 16. Like the aforementioned embodiments of the invention, the energy absorbing device 92 permits the occupant to be displaced from an initial seated position at a controlled velocity, absorbs the kinetic energy of the occupant as he is being displaced from his initial position so that he experiences a cushioned deceleration, and decelerates the occupant to a complete stop without the rebound effect which is characteristic of conventional seat belt systems.

Although we have described several embodiments of our invention, it is to be understood that various changes and revisions can be made therein without departing from the spirit of the invention.

What is claimed is:

1. In a vehicle, a safety seat belt system, comprising:
a support and an elongated seat belt having a first end connected to the support such that its opposite, second end can be moved with respect to the support;
a first and a second clamping member supported in the vehicle with the belt clamped between the clamping members to prevent a slack portion of the belt from becoming taut whenever the remainder of the belt is moved with respect to the support unless the belt is moved with a predetermined force.

2. In a vehicle, a safety seat belt system, comprising:
a support and an elongated seat belt having a first end connected to the support such that its opposite, second end can be moved with respect to the support;
a clamping means supported in the vehicle so as to be engageable with the belt to prevent a slack portion of the belt from becoming taut whenever the remainder of the belt is moved with respect to the support unless the belt is moved with a predetermined force;
said clamping means comprising a pair of members, fixed with respect to the support and closely spaced to define an opening; means supporting the belt such that it is threaded from a first side of the opening to its opposite side and then in a reverse direction through to the first side to form a closed loop; an elongated pin having a diameter larger than the opening and being disposed in the loop of the belt such that as the remainder of the belt becomes taut, the pin is wedged with the belt in the opening, and then is rotated about its longitudinal axis as the belt is moved away from said opening with said predetermined force to permit the slack portion of the belt to be moved around the pin and through the opening.

3. In a vehicle, a safety seat belt system, comprising:
a support and an elongated seat belt having a first end connected to the support such that its opposite, second end can be moved with respect to the support;
a clamping means supported in the vehicle so as to be engageable with the belt to prevent a slack portion of the belt from becoming taut whenever the remainder of the belt is moved with respect to the support unless the belt is moved with a predetermined force;
said clamping means comprising a housing provided with a pair of openings and mounted on the belt such that the belt extends through said pair of openings, a clamping member supported in said housing adjacent one of said openings, a member supported in said housing between the clamping member and the other opening and connected to the belt such that the slack portion of the belt is disposed between the two openings and is moved through at least one of the openings in response to the movement of the belt with a predetermined force away from that opening.

4. The invention as defined in claim 3, wherein said clamping member has a series of grooves supported transversely to the motion of the belt with respect to the clamping member, each groove having a V-shaped cross section; and including a second clamping member in said housing provided with a series of complementary shaped ridges opposedly mounted relative to said grooves, in close proximity thereto, and on the opposite side of the belt with respect to the first mentioned clamping member.

5. The invention as defined in claim 3, said clamping member has a series of grooves extending transversely to the direction of longitudinal movement of said belt with respect to the clamping member, each groove having a rectangular cross section, and including a second clamping member in said housing provided with a series of ridges, rectangular in cross section, and opposedly mounted in close proximity relative to said grooves, said belt being threaded between said ridges and said grooves.

6. In a vehicle, a safety seat belt system, comprising:
a support and an elongated seat belt having a first end connected to the support such that its opposite, second end can be moved with respect to the support;
a clamping means supported in the vehicle so as to be engageable with the belt to prevent a slack portion of the belt from becoming taut whenever the remainder of the belt is moved with respect to the support unless the belt is moved with a predetermined force;
said clamping means including a housing mounted on the belt with said slack portion disposed within said housing, the housing having an opening for passage of the belt and a pair of spaced opposed sides adjacent the opening and fixed with respect to one another; a member mounted in said housing on one of the sides, said member having a clamping surface inclined with respect to the opposite side and wherein the clamping member comprises a roller mounted on the clamping surface and engaged with the belt such that the belt and the roller are operable to be wedged between said member and the housing to isolate the slack portion in the housing until occurrence of an event producing the predetermined force on said belt.

7. In a vehicle having a safety seat belt system, means connected to one of the seat belts of the system for absorbing the energy produced upon impact of the vehicle by permitting a gradual elongation of the seat belt, said means comprising a housing member having an internal cavity substantially filled with a deformable material, an opening provided in said housing and an anchor member extending into said opening and having a widened portion spaced from said opening, said anchor member being connected with said belt whereby upon a predetermined force being applied to said belt said anchor will be moved through said deformable material toward said opening.

References Cited

UNITED STATES PATENTS

| | | | |
|---|---|---|---|
| 1,463,149 | 7/1923 | Cans | 188—65.5 |
| 2,947,353 | 8/1960 | Wimmersperg | 297—386 |
| 3,390,436 | 7/1968 | Prete | 24—196 |
| 3,400,977 | 9/1968 | Jones | 297—386 |
| 1,511,264 | 10/1924 | Carter | 188—1 |
| 3,089,564 | 5/1963 | Smittle | 297—386 X |
| 3,195,685 | 7/1965 | Blackstone | 297—386 X |
| 3,198,288 | 8/1965 | Presunka | 188—1 |
| 3,217,838 | 11/1965 | Peterson et al. | 188—1 |
| 3,232,383 | 2/1966 | Moberg | 297—386 X |
| 3,280,942 | 10/1966 | Millington | 297—386 X |
| 3,361,475 | 1/1968 | Villers | 297—386 |

FOREIGN PATENTS 1,393,185  2/1965  France.

JAMES T. McCALL, Primary Examiner

U.S. Cl. X.R.

188—1; 280—150